(12) United States Patent
Yang

(10) Patent No.: US 8,242,733 B2
(45) Date of Patent: Aug. 14, 2012

(54) ASYNCHRONOUS AC INDUCTION ELECTRICAL MACHINES IN CROSS-INTERLOCKINGLY PARALLEL CONNECTION

(76) Inventor: Tai-Her Yang, Dzan-Hwa (TW)

( * ) Notice: Subject to any disclaimer, the term of this patent is extended or adjusted under 35 U.S.C. 154(b) by 532 days.

(21) Appl. No.: 12/382,952

(22) Filed: Mar. 27, 2009

(65) Prior Publication Data

US 2010/0148717 A1     Jun. 17, 2010

Related U.S. Application Data

(63) Continuation-in-part of application No. 12/314,629, filed on Dec. 15, 2008, now abandoned.

(51) Int. Cl.
*H02P 5/00* (2006.01)
*H02P 1/54* (2006.01)

(52) U.S. Cl. ............. 318/767; 318/49; 318/93; 318/95; 318/112

(58) Field of Classification Search .................... 318/34, 318/41, 49, 50, 83, 93, 95, 98–100, 111–113, 318/767; 310/44, 68 D, 133, 134, 156.55, 310/185, 208
See application file for complete search history.

(56) References Cited

U.S. PATENT DOCUMENTS

| 7,859,200 B2* | 12/2010 | Yang | 318/34 |
| 2010/0148617 A1* | 6/2010 | Yang | 310/195 |

* cited by examiner

*Primary Examiner* — Derek Rosenau
(74) *Attorney, Agent, or Firm* — Bacon & Thomas, PLLC

(57) ABSTRACT

At least two asynchronous AC induction electrical machines in parallel connection with the power source respectively include a main winding and control winding for operating the electrical machines, wherein the individually load driving operations of the two electrical machines in cross-interlocked parallel connection with the power source respond to changes in individual electrical machine loading statuses to provide variable impedance operation so as to change the end voltage ratio between the individual electrical machines.

19 Claims, 5 Drawing Sheets

ASYNCHRONOUS AC INDUCTION ELECTRICAL MACHINES IN CROSS-INTERLOCKINGLY PARALLEL CONNECTION

BACKGROUND OF THE INVENTION (a) Field of the Invention

The present invention innovatively discloses that at least two asynchronous AC induction electrical machines (hereinafter referred to as electrical machine) in parallel connection with the power source are respectively installed with a main winding and control winding for electrical machine operation, wherein the two electrical machines are combined by a cross-interlocked parallel connection that includes the following:

The first electrical machine control winding and the first electrical machine main winding are windingly installed on the same polar axis or windingly installed at an electrical angle between polar axes within the first electrical machine, wherein the two electrical machines are optionally operated in cross-interlocked parallel connection according to operating requirements of the polarity relationship between the two electrical machines to provide: 1) additive excitation operation in the same polarities, or 2) differential excitation operation in reverse polarities;

The second electrical machine control winding and the second electrical machine main winding are windingly installed on the same polar axis or windingly installed at an electrical angle between polar axes within the second electrical machine, wherein the two electrical machines are optionally operated in cross-interlocked parallel connection according to operating requirements of the polarity relationship between the two electrical machines to provide: 1) additive excitation operation in the same polarities, or 2) differential excitation operation in reverse polarities;

The first electrical machine main winding is the main operating winding of the first electrical machine, while the first terminal of the first electrical machine control winding is connected with the second terminal of the second electrical machine main winding installed in the second electrical machine;

The second electrical machine main winding is the main operating winding of the second electrical machine, wherein the first terminal of the second electrical machine control winding is connected with the second terminal of the first electrical machine main winding installed in the first electrical machine;

The first terminal of the first electrical machine main winding is connected with the first terminal of the second electrical machine main winding and further connected to the first terminal of the power source for input or output of electric power;

The second terminal of the first electrical machine control winding is connected with the second terminal of the second electrical machine control winding and further connected to the second terminal of the power source for input or output electric power;

The windings of the first electrical machine and second electrical machine are parallel connected and are driven by the power source, wherein the operational effect of the first electrical machine and the second electrical machine being in cross-interlocked parallel connection to drive the load individually results from changes in individual electrical machine loading status to provide variable impedance operation so as to change the end voltage ratio between individual electrical machines in cross-interlocked parallel connection, thereby allowing each individual electrical machine to produce an interaction having a required electromagnetic effect.

Especially for the application of multiple asynchronous AC induction electrical machines to drive a common load, when the common load varies in an unstable fashion against loads imposed by individual asynchronous AC induction electrical machines, such as in the example of using individual asynchronous AC induction electrical machines to drive different wheels, the load at the wheels on both sides will vary accordingly when the vehicle is making a turn. In the example of a tram connecting multiple coaches to constitute a common load with individual asynchronous AC induction electrical machines disposed on individual coaches to drive the coaches individually, when the tram is speeding, decelerating or climbing up/down slopes, the common load varies according to the load imposed by the individually disposed asynchronous AC induction electrical machines, and therefore the real time response and adjustment between individual asynchronous AC induction electrical machines is very important. The conventional solution is to use individual detecting devices installed on individual asynchronous AC induction electrical machines to deliver a signal indicative of load variations to a central controller, and then to drive a control device disposed on individual asynchronous AC induction electrical machines and subject to the control of the central controller so as to control the corresponding operation performance of the individual asynchronous AC induction electrical machines. The conventional solution has the drawbacks of being a complicated system, and having lower reliability and longer response adjustment time period between individual asynchronous AC induction electrical machines, so that when applied to for example the tram connecting multiple coaches to constitute the common load as aforementioned, the individual coaches are prone to generate a jostle phenomenon;

The present invention innovatively proposes to solve these problems by providing asynchronous AC induction electrical machines in cross-interlocked parallel connection through the windings of multiple asynchronous AC induction electrical machines to thereby generate random adjustment of the operation performance according to the load variations, thereby having the advantages of simplifying the system and increasing the reliability, as well as shortening the response adjustment time period of asynchronous AC induction electrical machines to load variations so as to promote the stability of the system.

(b) Description of the Prior Art

When multiple units of conventional asynchronous AC induction electrical machines are parallel connected for motor or generator function and individually operated to drive the load, the individual electrical machines operate independently, and thereby are unable to interact to improve the overall response to load variations.

SUMMARY OF THE INVENTION

The present invention innovatively discloses that at least two asynchronous AC induction electrical machines (hereinafter referred to as electrical machines) in parallel connection with the power source are respectively installed with a main winding and control winding for electrical machine operation, the two electrical machines being in cross-interlocked parallel connection, wherein the first electrical machine main winding is the main operating winding of the first electrical machine, while the first electrical machine control winding is series connected with the second electrical machine main winding of the second electrical machine, the first electrical machine control winding and the first electrical machine main winding are windingly installed on the same polar axis or windingly installed at and electrical angle between polar axes within the first electrical machine, and the two electrical machines are optionally operated in cross-interlocked parallel connection according to operating requirements of the polarity relationship between the two electrical machines to provide: 1) additive excitation operation in the same polarities, or 2) differential excitation operation in reverse polarities. The second electrical machine main winding relatively installed within the second electrical machine is the main operating winding of the first electrical machine, while the second electrical machine control winding is series connected with the first electrical machine main winding of the first electrical machine, and the second electrical machine control winding and the second electrical machine main winding are windingly installed on the same polar axis or windingly installed at electrical angle between polar axes within the second electrical machine, wherein the two electrical machines are optionally operated in cross-interlocked series connection according to operating requirements of the polarity relationship between the two electrical machines to provide 1) additive excitation operation in the same polarities, or 2) differential excitation operation in reverse polarities. As a result, when the electrical machines in parallel connection with the power source are individually driven in loading operation, the cross-interlocked parallel connected electrical machines provide variable impedance operation to follow variations in individual load-driving status to thereby let each individual electrical machine produce required interactive reactions in the electrical machine effect.

Use of multiple asynchronous AC induction electrical machines to drive a common load is especially advantageous when the common load varies in an unstable manner with respect to the loads imposed on individual asynchronous AC induction electrical machines, such as in the example of using individual asynchronous AC induction electrical machines to drive different wheels where the load at the wheels on both sides will vary accordingly when the vehicle is making a turn, or the example of the tram connecting multiple coaches to constitute a common load, the coaches being driven by individual asynchronous AC induction electrical machines, where when the tram is speeding, decelerating or climbing up/down slopes, the common load varies according to the load imposed on individually disposed asynchronous AC induction electrical machines, such that the real time response and adjustment between individual asynchronous AC induction electrical machines is very important. As explained above, the conventional solution in these examples is to use individual detecting devices installed on individual asynchronous AC induction electrical machines to deliver a signal indicative of load variations to a central controller, and then to subject drive control devices disposed on individual asynchronous AC induction electrical machines to the control of the central controller so as to control the corresponding operation performance of individual asynchronous AC induction electrical machines, the conventional solution having the drawbacks of being complicated, having lower reliability, and having a longer response adjustment time period between individual asynchronous AC induction electrical machines. As a result, when the conventional solution is applied to the tram connecting multiple coaches to constitute a common load as aforementioned, the individual coaches are prone to generate jostle phenomenon.

The present invention thus innovatively discloses that asynchronous AC induction electrical machines be connected in cross-interlocked parallel connection through the windings of multiple asynchronous AC induction electrical machines to enable random adjustment of the operation performance according to load variations, and thereby obtain the advantages of simplifying the system, increasing the reliability, and shortening the response adjustment time period of the asynchronous AC induction electrical machines to load variations so as to promote the stability of the system. In practical applications, the asynchronous AC induction electrical machines in cross-interlocked parallel connection include the following:

The electrical specifications and characteristics of the main windings installed within respective individual asynchronous AC induction electrical machines can be the same or different;

The electrical specifications and characteristics of the control windings installed within respective individual asynchronous AC induction electrical machines can be the same or different;

The rated specifications and operating characteristics of respective individual asynchronous AC induction electrical machines can be the same or different;

The individual electrical machines can be constituted by asynchronous AC induction electrical machines having the same or different structural types and different operating characteristics;

For the asynchronous AC induction electrical machines in cross-interlocked parallel connection of the present invention, the individual electrical machines which are mutually parallel connected are directly driven by any AC electric power source, including AC single phase or multiple phase power sources, or DC to AC power sources, wherein the power sources can be fixed or modulated by voltage, frequency, or frequency and voltage together, to provide a desired rotational speed, rotating torque, or rotational direction, or for power regeneration braking operations or use as a coupling transmission device.

DESCRIPTION OF MAIN COMPONENT SYMBOLS

Figure 1:
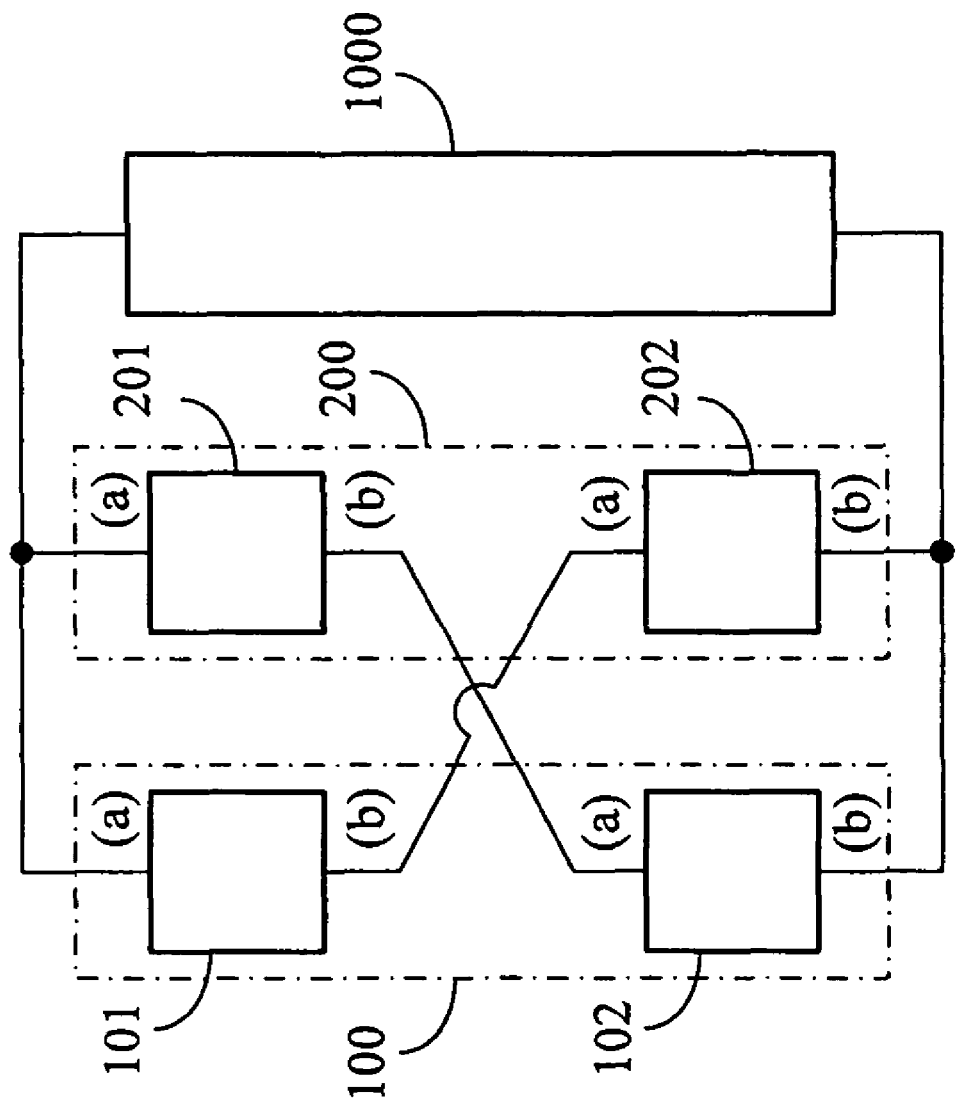
FIG. 1 is a structural schematic view of asynchronous AC induction electrical machines in cross-interlocked parallel connection according to the present invention, comprising two asynchronous AC induction electrical machines in series connection.

100: First electrical machine
101: First electrical machine main winding
102: First electrical machine control winding
200: Second electrical machine
201: Second electrical machine main winding 202: Second electrical machine control winding
300: Third electrical machine
301: Third electrical machine main winding
302: Third electrical machine control winding
1000: Power source
3100: First 3-phase electrical machine
3101: First 3-phase electrical machine main winding
3102: First 3-phase electrical machine control winding
3200: Second 3-phase electrical machine
3201: Second 3-phase electrical machine main winding
3202: Second 3-phase electrical machine control winding

DETAILED DESCRIPTION OF THE PREFERRED EMBODIMENTS

The principle of the present invention is delineated in the following: FIG. 1 is a structural schematic view of asynchronous AC induction electrical machines in cross-interlocked parallel connection according to the present invention, comprising two asynchronous AC induction electrical machines in parallel connection.

As shown in FIG. 1, the cross-interlocked parallel connected circuit is driven by power source (1000) which includes AC single phase or multiple phase power sources, or a DC to AC power source. The power source can be fixed or modulated by voltage, frequency, or frequency and voltage together.

The present invention innovatively discloses that at least two asynchronous AC induction electrical machines (hereinafter referred to as electrical machine) in parallel connection with the power source are respectively installed with a main winding and control winding for electrical machine operation, wherein the two electrical machines in cross-interlocked parallel connection have, by way of example, the following characteristics:

The first electrical machine main winding (101) is the main operating winding of the first electrical machine (100), while terminal (a) of the first electrical machine control winding (102) is series connected with terminal (b) of the second electrical machine main winding (201) of the second electrical machine (200), and the first electrical machine control winding (102) and the first electrical machine main winding (101) are windingly installed on the same polar axis or windingly installed at an electrical angle between polar axes within the first electrical machine (100), wherein the two electrical machines (100, 200) are optionally operated in cross-interlocked parallel connection according to operating requirements of the polarity relationship between the two electrical machines to provide: 1) additive excitation operation in the same polarities, or 2) differential excitation operation in reverse polarities;

The second electrical machine main winding (201) installed within the second electrical machine (200) is the main operating winding of the second electrical machine (200), while terminal (a) of the second electrical machine control winding (202) is series connected with terminal (b) of the first electrical machine main winding (101) of the first electrical machine (100), and the second electrical machine control winding (202) and the second electrical machine main winding (101) are windingly installed on the same polar axis or windingly installed at an electrical angle between polar axes within the second electrical machine (200), wherein the two electrical machines are optionally operated in cross-interlocked parallel connection according to operating requirements of the polarity relationship between the two electrical machines to provide: 1) additive excitation operation in the same polarities, or 2) differential excitation operation in reverse polarities;

The terminal (a) of the first electrical machine main winding (101) of the first electrical machine (100) and the terminal (a) of the second electrical machine main winding (201) of the second electrical machine (200) are connected to one terminal of the power source (1000); and the terminal (b) of the first electrical machine control winding (102) of the first electrical machine (100) is connected with terminal (b) of the second electrical machine control winding (202) of the second electrical machine (200) to further connect to the other terminal of the power source (1000), wherein the two electrical machines (100, 200) in cross-interlocked parallel connection with the power source (1000) provide variable impedance operation following variations in individual load-driving status of the individual electrical machines to thereby let each respective mutually interlocked parallel connected individual electrical machine produce the required interactive reactions by electrical machine effect.

During electricity discharge operation, if the current is changed due to loading variation of the first electrical machine (100), then the exciting current of the second electrical machine control winding (202) of the second electrical machine (200) series connected with the first electrical machine main winding (101) is simultaneously varied, so that the magnetic flux between the second electrical machine main winding (201) and the second electrical machine control winding (202) is varied according to the polarity relationship, the positional relationship of the polar axis electrical angle, and/or the phase relationship of exciting current between the two electrical machines, thereby allowing the torque and rotational speed of the second electrical machine (200) to be simultaneously adjusted following the changes of its own end voltage and load as well as the changes of operating current at the first electrical machine main winding (101) of the first electrical machine (100) series connected with the second electrical machine control winding (202). However, if the current is changed due to loading variation of the second electrical machine (200), then exciting current of the first electrical machine control winding (102) of the first electrical machine (100) series connected with the second electrical machine main winding (201) is simultaneously varied, so that the magnetic flux between the first electrical machine main winding (101) and the first electrical machine control winding (102) is varied according to the polarity relationship, positional relationship of polar axis electrical angle, and/or phase relationship of exciting current between the two electrical machines, thereby allowing the torque and rotational speed of the first electrical machine (100) to be simultaneously adjusted following changes of its own load and changes of operating current at the second electrical machine main winding (201) of the second electrical machine (200) series connected with the first electrical machine control winding (102).

Figure 2:
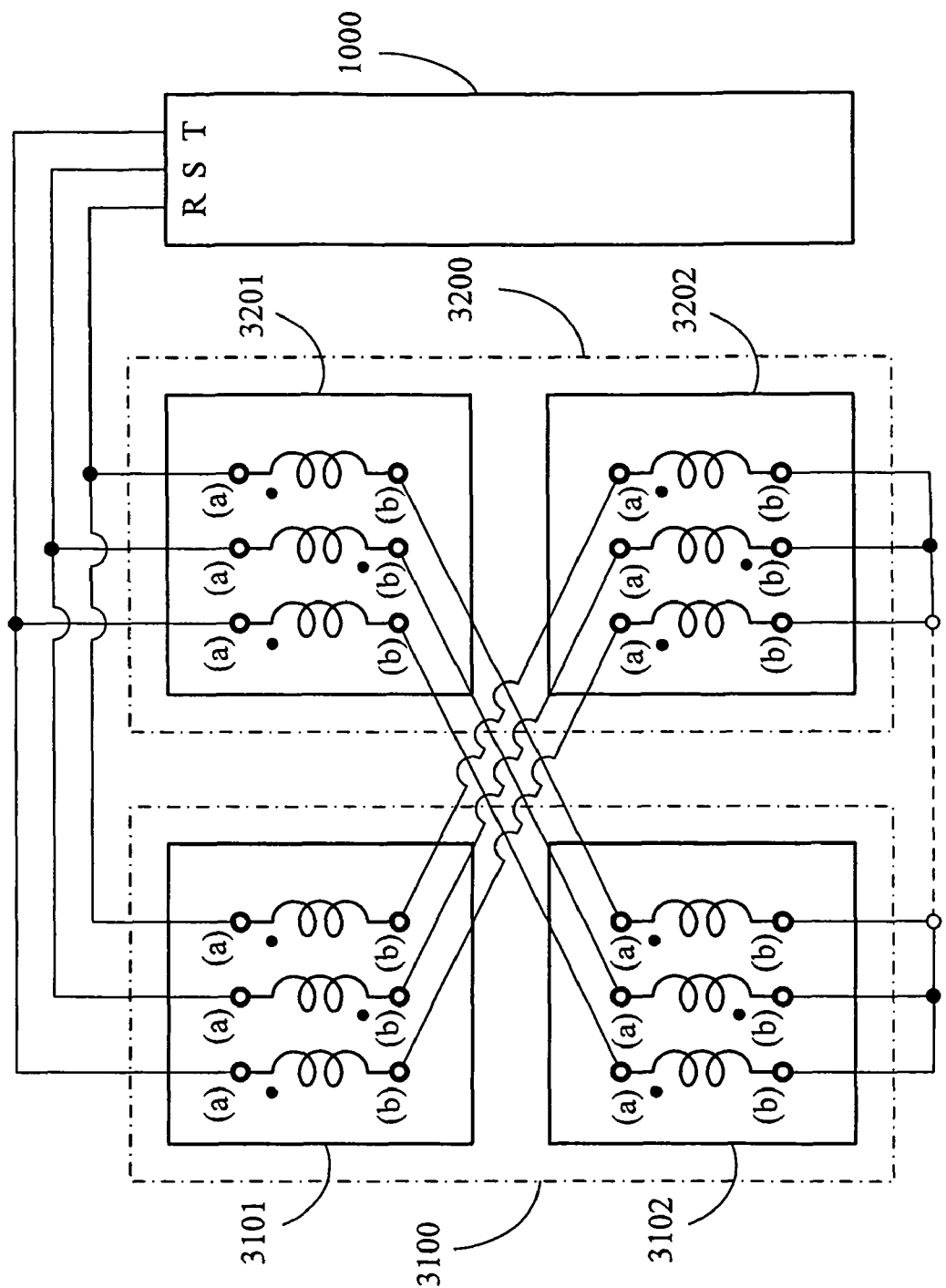
FIG. 2 is a schematic view of the embodiment of the present invention showing that two Y connected 3-phase asynchronous AC induction electrical machines are in cross-interlocked parallel connection to be driven by a 3-phase AC power source.

FIG. 2 is a schematic view of the embodiment of the present invention showing that two Y connected 3-phase asynchronous AC induction electrical machines are in cross-interlocked parallel connection to be driven by the 3-phase AC power source;
wherein:
The first 3-phase electrical machine control winding (3102) and the first 3-phase electrical machine main winding (3101) are windingly installed on the same polar axis or windingly installed at an electrical angle between polar axes within the first 3-phase electrical machine (3100), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The second 3-phase electrical machine control winding (3202) and the second 3-phase electrical machine main winding (3201) are windingly installed on the same polar axis or windingly installed at an electrical angle between polar axes within the second 3-phase electrical machine (3200), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The first 3-phase electrical machine main winding (3101) is the main operating winding of the first 3-phase electrical machine (3100), wherein terminal (a) of each phase winding of the first 3-phase electrical machine control winding (3102) is connected with terminal (b) of each phase winding of the second 3-phase electrical machine main winding (3201) installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) installed within the first 3-phase electrical machine (3100);

The terminal (a) of each phase winding of the first 3-phase electrical machine main winding (3101) and the terminal (a) of each phase winding of the second 3-phase electrical machine main winding (3201) are connected to terminals R.S.T. of the 3-phase power source;

The terminal (b) of each phase winding of the first 3-phase electrical machine control winding (3102) is commonly in Y connection, and the terminal (b) of each phase winding of the second 3-phase electrical machine control winding (3202) is commonly in Y connection, wherein the common Y connecting point of the two electrical machines (3100, 3200) can be separated, or the common Y connecting point of the two electrical machines (3100, 3200) can be connected;

The first 3-phase electrical machine (3100) and the second 3-phase electrical machine (3200) are connected to the AC 3-phase power source (1000), wherein the first 3-phase electrical machine (3100) and the second 3-phase electrical machine (3200) in the operation of individually driven loadings provide, by the effect of cross-interlocked parallel connected operation, a variable impedance operation according to the changes of individual electrical machine driving loading statuses so as to change the end voltage ratio between the individual electrical machines in cross-interlocked parallel connection, thereby allowing each individual electrical machine to produce interactions of required electromagnetic effect.

Figure 3:
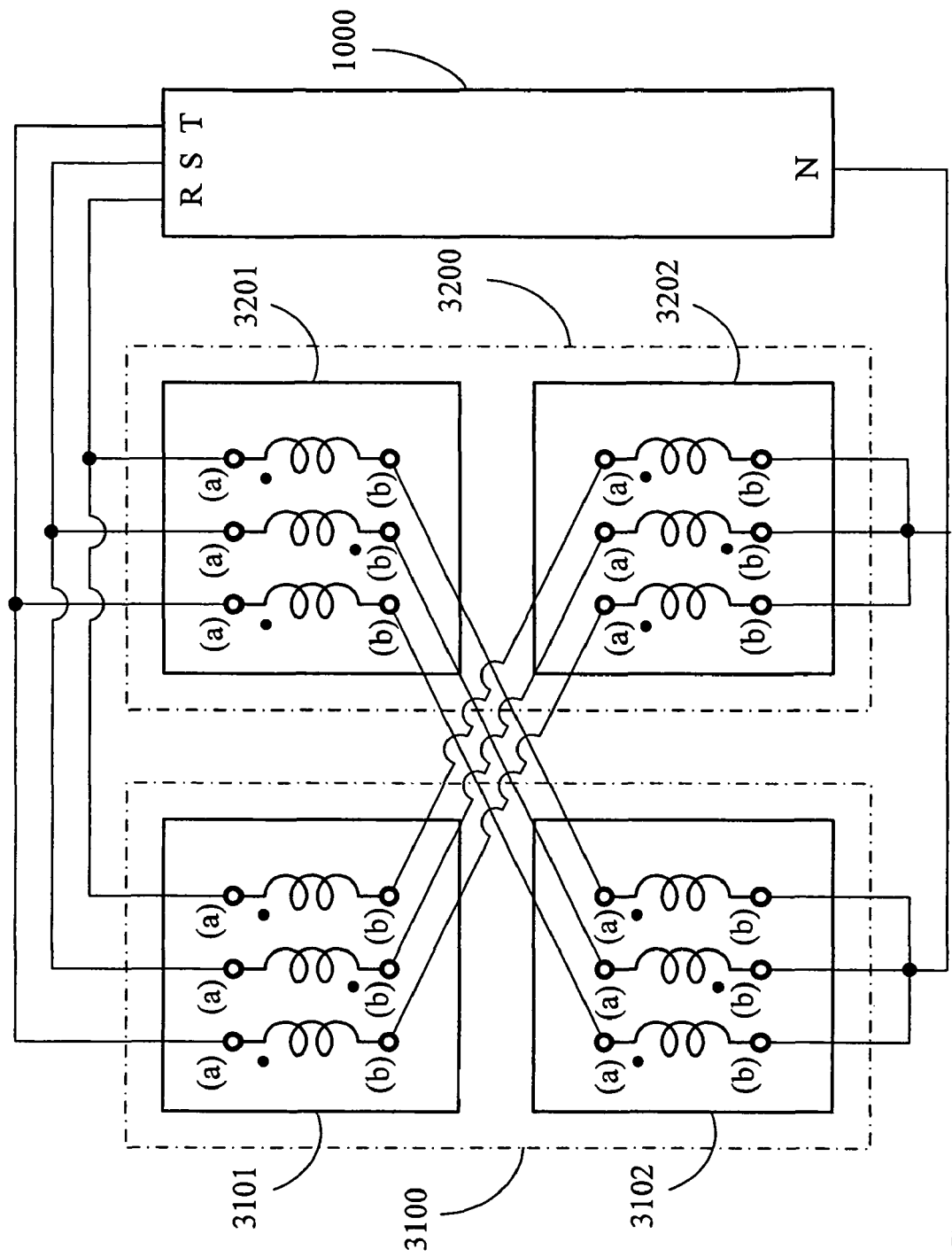
FIG. 3 is a schematic view of the embodiment of the present invention showing that two 3-phase 4-wire Y connected 3-phase asynchronous AC induction electrical machines are in cross-interlocked parallel connection to be driven by a 3-phase 4-wire power source.

FIG. 3 is a schematic view of the embodiment of the present invention showing that two 3-phase 4-wire Y connected 3-phase asynchronous AC induction electrical machines are in cross-interlocked parallel connection to be driven by the 3-phase 4-wire power source;

wherein:

The first 3-phase electrical machine control winding (3102) and the first 3-phase electrical machine main winding (3101) are windingly installed on the same polar axis or windingly installed at an electrical angle between polar axes within the first 3-phase electrical machine (3100), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The second 3-phase electrical machine control winding (3202) and the second 3-phase electrical machine main winding (3201) are windingly installed on the same polar axis or windingly installed at an electrical angle between polar axes within the second 3-phase electrical machine (3200), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The first 3-phase electrical machine main winding (3101) is the main operating winding of the first 3-phase electrical machine (3100), wherein terminal (a) of each phase winding of the first 3-phase electrical machine control winding (3102) is connected with terminal (b) of each phase winding of the second 3-phase electrical machine main winding (3201) installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) installed within the first 3-phase electrical machine (3100);

The terminal (a) of each phase winding of the first 3-phase electrical machine main winding (3101) and the terminal (a) of each phase winding of the second 3-phase electrical machine main winding (3201) are commonly connected to terminals R.S.T. of the AC 3-phase 4-wire power source (1000);

The terminal (b) of each phase winding of the first 3-phase electrical machine control winding (3102) is commonly connected and the terminal (b) of each phase winding of the second 3-phase electrical machine control winding (3202) is commonly in Y connection, wherein the common Y connecting point of the two electrical machines is connected to the neutral terminal N of the AC 3-phase 4-wire power source;

The first 3-phase electrical machine (3100) and the second 3-phase electrical machine (3200) are driven by the AC 3-phase 4-wire power source (1000), wherein the first 3-phase electrical machine (3100) and the second 3-phase electrical machine (3200) in the operation of individually driven loads provide, due to the effect of cross-interlocked parallel connected operation, variable impedance operation according to changes in individual electrical machine driving loading statuses so as to change the end voltage ratio between the individual electrical machines in cross-interlocked parallel connections, thereby allowing each individual electrical machine to produce interactions of required electromagnetic effect.

Figure 4:
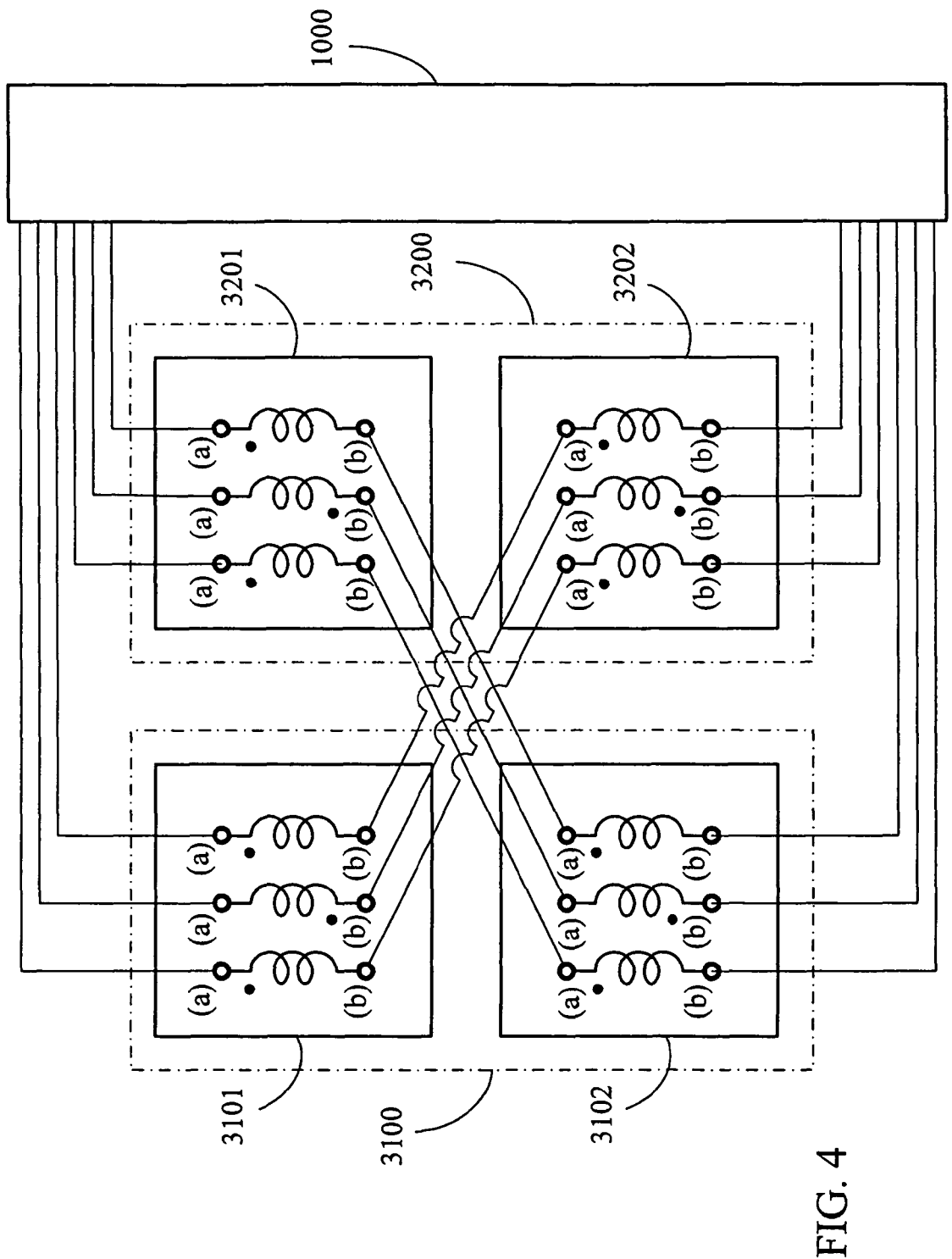
FIG. 4 is a schematic view of the embodiment of the present invention showing that two Δ connected 3-phase asynchronous AC induction electrical machines are in cross-interlocked parallel connection to be driven by the 3-phase AC power source.

FIG. 4 is a schematic view of the embodiment of the present invention showing that two Δ connected 3-phase asynchronous AC induction electrical machines are in cross-interlockingly parallel connection to being driven by the 3-phase AC power source;

wherein:

The first 3-phase electrical machine control winding (3102) and the first 3-phase electrical machine main winding (3101) are windingly installed on the same polar axis or windingly installed at an electrical angle between polar axes within the first 3-phase electrical machine (3100), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The second 3-phase electrical machine control winding (3202) and the second 3-phase electrical machine main winding (3201) are windingly installed on the same polar axis or windingly installed at an electrical angle between polar axes within the second 3-phase electrical machine (3200), wherein the two electrical machines (3100, 3200) are optionally operated in cross-interlocked parallel connection according to operating requirements of the polarity relationship between the two electrical machines to provide: 1) additive excitation operation in the same polarities, or 2) differential excitation operation in reverse polarities;

The first 3-phase electrical machine main winding (3101) is the main operating winding of the first 3-phase electrical machine (3100), wherein the first terminal of the first 3-phase electrical machine control winding (3102) is connected with the second terminal of the second 3-phase electrical machine main winding (3201) installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) installed within the first 3-phase electrical machine (3100);

The connecting methods of the 3-phase Δ connection can be as follows:

The terminal (a) of each phase winding of the first 3-phase electrical machine main winding (3101) and terminal (b) of each phase winding of the first 3-phase electrical machine control winding (3102) are in 3-phase Δ connection and further connected to the AC 3-phase power source (1000);

The terminal (a) of each phase winding of the second 3-phase electrical machine main winding (3201) and terminal (b) of each phase winding of the first 3-phase electrical machine control winding (3102) are in 3-phase Δ connection and further connected to the AC 3-phase power source (1000);

The connecting methods of the 3-phase Δ connection can also be the following:

The terminal (a) of each phase winding of the first 3-phase electrical machine main winding (3101) and terminal (b) of each phase winding of the first 3-phase electrical machine control winding (3102) are in 3-phase Δ connection and further connected to the AC 3-phase power source (1000);

The terminal (a) of each phase winding of the second 3-phase electrical machine main winding (3201) and terminal (b) of each phase winding of the second 3-phase electrical machine control winding (3202) are in 3-phase Δ connection and further connected to the AC 3-phase power source (1000);

The first 3-phase electrical machine (3100) and the second 3-phase electrical machine (3200) are connected to the AC 3-phase power source (1000), wherein the first 3-phase electrical machine (3100) and the second 3-phase electrical machine (3200) in the operation of individually driven loadings provide, as a result of the effect of cross-interlocked parallel connected operation, variable impedance operation according to changes in individual electrical machine driving loading statuses so as to change the end voltage ratio between the individual electrical machines in cross-interlocked parallel connection, thereby allowing each individual electrical machine to produce interactions of required electromagnetic effect.

Figure 5:
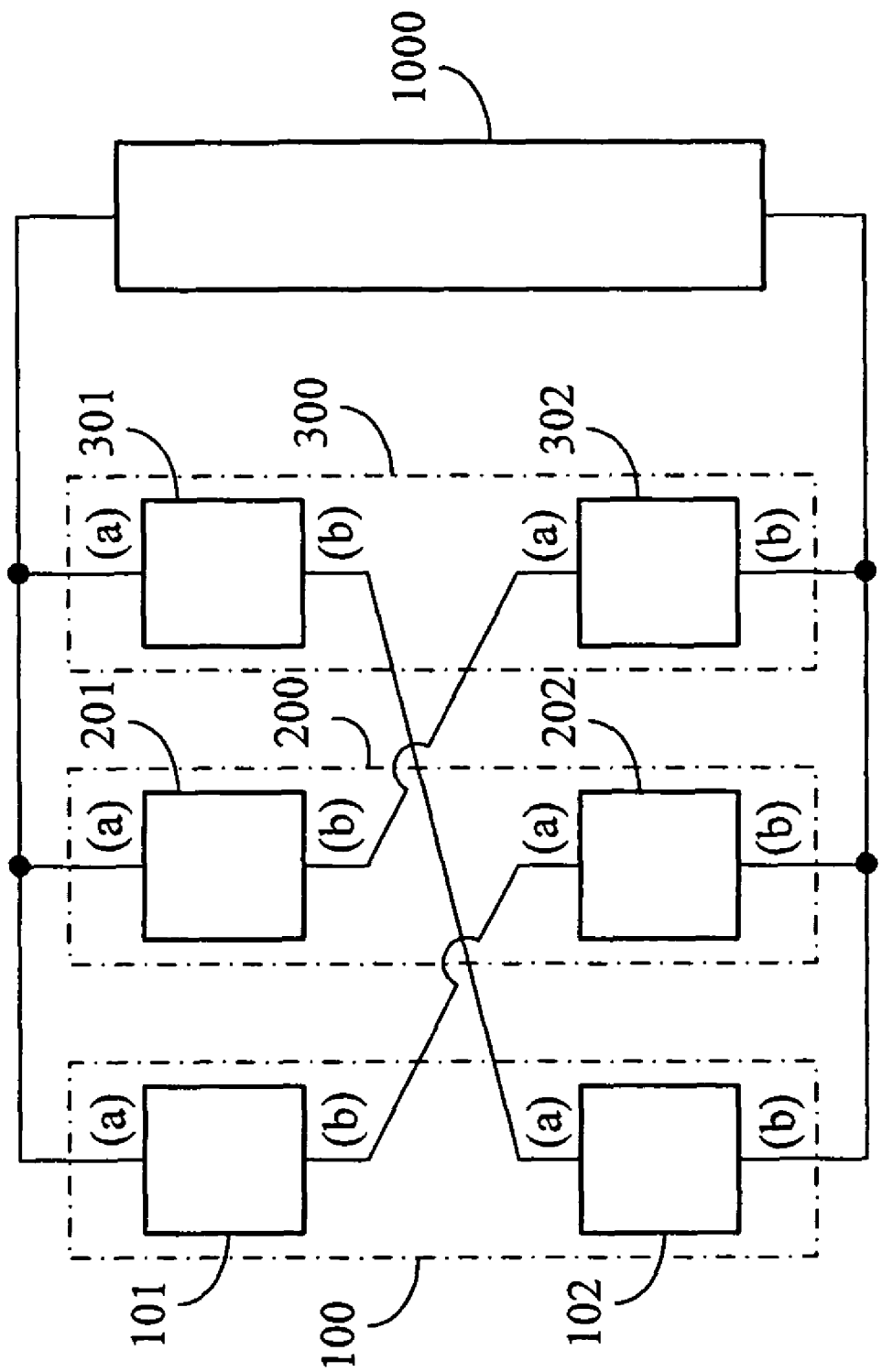
FIG. 5 is a structural schematic view of asynchronous AC induction electrical machines in cross-interlocked parallel connection according to the present invention, comprising three asynchronous AC induction electrical machines in parallel connection.

The aforesaid principles can also be applied to multiple electrical machines, such as those shown in FIG. 5, which is a structural schematic view of three asynchronous AC induction electrical machines in cross-interlocked parallel connection of the present invention, including the following features:

The magnetic field structure of the first electrical machine (100) is windingly installed with the first electrical machine main winding (101) and windingly installed with the first electrical machine control winding (102) on the same polar axis or at an electrical angle between polar axes, wherein terminal (a) of the first electrical machine control winding (102) is series connected with terminal (b) of the third electrical machine main winding (301) windingly installed within the third electrical machine (300); the magnetic field of the second electrical machine (200) is windingly installed with the second electrical machine main winding (201) and windingly installed with the second electrical machine control winding (202) on the same polar axis or at an electrical angle between polar axes, wherein terminal (a) of the second electrical machine control winding (202) is series connected with terminal (b) of the first electrical machine main winding (101) windingly installed within the first electrical machine (100); the magnetic field of the third electrical machine (300) is windingly installed with the third electrical machine main winding (301) and windingly installed with the third electrical machine control winding (302) on the same polar axis or at an electrical angle between polar axes, and terminal (a) of the third electrical machine control winding (302) is series connected with terminal (b) of the second electrical machine main winding (201) windingly installed within the second electrical machine (200);

The terminal (a) of the first electrical machine main winding (101) of the first electrical machine (100) and terminal (a) of the second electrical machine main winding (201) of the second electrical machine (200) are connected with the terminal (a) of the third electrical machine main winding (301) of the third electrical machine (300) and further connected to one terminal of the power source (1000); and the terminal (b) of the first electrical machine control winding (102) of the first electrical machine (100) and terminal (b) of the second electrical machine control winding (202) of the second electrical machine (200) are connected with the terminal (b) of the third electrical machine control winding (302) of the third electrical machine (300) and further connected to the other terminal of the power source (1000), wherein the particular parallel connections between main windings and control windings enable the three electrical machines to be individually powered by the power source (1000) to drive loads and yet to follow variations in individual load-driven statuses of individual electrical machines to allow the individual electrical machines to produce required interactive reactions by the electrical machine effect.

For the asynchronous AC induction electrical machines in cross-interlocked parallel connection of present invention, if the number of constituting electrical machines is increased to more than three, the aforesaid principles and theories can be similarly deduced.

The asynchronous AC induction electrical machines in cross-interlocked parallel connection of present invention may each be constituted by a rotating magnetic field structure and interactive body asynchronously actuated by the electromagnetic effect.

In practical application, the asynchronous AC induction electrical machines in cross-interlocked parallel connection of the present invention can be constituted by multiple units of one type or mixed types of squirrel cage type electrical machines or eddy current induction type asynchronous AC electrical machines to implement the following functional requirements: 1) for asynchronous AC induction squirrel cage type motor functional operations; or 2) for asynchronous eddy current induction motor functional operations; or 3) for asynchronous AC induction squirrel cage type generator functional operations; or 4) for asynchronous eddy current induction generator functional operations; or 5) for partial generator functional operation and partial motor functional operation; or 6) as an induction squirrel cage type electrical machine braking device; or 7) as an eddy current induction type electrical machine braking device; or 8) as an asynchronous induction squirrel type electromagnetic coupling transmission device; or 9) as an asynchronous eddy current induction type electromagnetic coupling transmission device.

For the asynchronous AC induction electrical machines in cross-interlocked parallel connection of present invention, the excitation relationships between the main winding and the control winding in the electrical machine itself include the following:

(1) The main windings and control windings within all electrical machines themselves are installed in the same polarities; or (2) The main windings and control windings within all electrical machines themselves are installed in reverse polarities; or (3) The main windings and control windings within partial electrical machines themselves are installed in the same polarities, while the main windings and control windings within partial electrical machines themselves are installed in reverse polarities.

For the asynchronous AC induction electrical machines in cross-interlocked parallel connection of present invention, the main winding and control winding within the individual electrical machine are installed on the same polarities or installed at an electrical angle difference, wherein the method of installation at an electrical angle difference is through the control winding passing current to change a distribution shape of the magnetic field caused by the control winding and therefore of the main magnetic field.

For the asynchronous AC induction electrical machines in cross-interlocked parallel connection of the present invention, the individual electrical machines are mutually series connected and are directly driven by an AC electric power source, which may include an AC single phase or multi-phase power source, or a DC to AC power source; wherein the power source is fixedly or voltage modulated, or is commonly modulated by frequency or voltage, or modulated by frequency and voltage simultaneously to modulate rotational speed, rotating torque, or rotational direction, or to enable power regeneration braking operations, or for use as a coupling transmission device based on an asynchronous electromagnetic effect.

The invention claimed is:

1. Asynchronous AC induction electrical machines in cross-interlocked parallel connection, comprising:
a first electrical machine and a second electrical machine, each said electrical machine having a control winding and a main winding, said control windings and main windings of the respective first and second electrical machines being coaxial or at a predetermined electrical angle difference, and said control windings and main windings having a same polarity for additive excitation or opposite polarities for differential excitation, said first and second electrical machines being parallel connected with a power source, as follows:
first terminals of the first electrical machine main winding and second electrical machine main winding are connected with the power source for input or output of electrical power,
a second terminal of the first electrical machine control winding is connected to a first terminal of the second electrical machine control winding,
a second terminal of the second electrical machine main winding is connected to a first terminal of the first electrical machine control winding, and
second terminals of the first and second electrical machine control windings are connected to each other,
wherein changes in a load on one of the electrical machines causes changes in impedance in a winding of the other of the electrical machines to change a voltage ratio between the electrical machines and enable individual driving characteristics of the respective first and second electrical machines to change accordingly.

2. The asynchronous AC induction electrical machines of claim 1, wherein electrical specifications and characteristics of any one or more of the first and second electrical machine main and control windings, or of one or both of the first and second electrical machines, are identical.

3. The asynchronous AC induction electrical machines of claim 1, wherein electrical specifications and characteristics of any one or more of the first and second electrical machine main and control windings, or of one or both of the first and second electrical machines, are different.

4. The asynchronous AC induction electrical machines of claim 1, wherein said power source is a single or multiple phase AC or DC-to-AC power source, wherein an output of the power is fixed or modulated to control a rotational speed, torque, or direction of the electrical machines, carry out regenerative braking operations, or enable the electrical machines to serve as a coupling transmission device.

5. The asynchronous AC induction electrical machines of claim 1, wherein, during an electricity discharge operation:
when a current in the first electrical machine main winding changes due to a variation in load, an excitation current in the second electrical machine control winding varies simultaneously as at result of the series connection between the control winding of the second electrical machine and the main winding of the first electrical machine, so that a magnetic flux between the second electrical machine control and main windings varies according to the relative polarities or electrical angle difference relationship between the second electrical machine control and main windings, causing a phase difference between the voltages in the control and main windings and thereby allowing a torque and rotational speed of the second electrical machine to be adjusted in response to the variation in load or changes in current of the first electrical machine main winding, and
when a current in the second electrical machine changes, a torque and rotational speed of the first electrical machine is correspondingly adjusted in response to the change in current of the second electrical machine main winding.

6. The asynchronous AC induction electrical machines of claim 1, wherein each of said first and second electrical machines is a three-phase asynchronous AC induction electrical machine, and said power source is a three-phase power source.

7. The asynchronous AC induction electrical machines of claim 6, wherein each of said first and second electrical machines is wye-connected.

8. The asynchronous AC induction electrical machines of claim 6, wherein each of said first and second electrical machines is delta-connected.

9. The asynchronous AC induction electrical machines of claim 6, wherein phase windings of the main and control windings of the first and second electrical machines are parallel connected with a power source, as follows:
- first terminals of each phase winding of the first and second electrical main windings is connected with a respective terminal of the power source for input or output of electrical power,
- a second terminal of each phase winding of the first electrical machine main winding is connected to a first terminal of each respective phase winding of the second electrical machine control winding,
- a second terminal of each phase winding of the second electrical machine main winding is connected to a first terminal of each respective phase winding of the first electrical machine control winding, and
- second terminals of each phase winding of the first and second electrical machine control windings are connected to each other.

10. The asynchronous AC induction electrical machines of claim 9, wherein said second terminals of each phase winding of the second electrical machine control winding are also connected to a neutral terminal of the power source.

11. The asynchronous AC induction electrical machines of claim 6, wherein phase windings of the main and control windings of the first and second electrical machines are parallel connected with a power source, as follows:
- first terminals of each phase winding of the first and second electrical main windings is connected with a respective first terminal of the power source for input or output of electrical power,
- a second terminal of each phase winding of the first electrical machine main winding is connected to a first terminal of each respective phase winding of the second electrical machine control winding,
- a second terminal of each phase winding of the second electrical machine main winding is connected to a first terminal of each respective phase winding of the first electrical machine control winding, and
- second terminals of each phase winding of the first and second electrical machine control windings are connected to a respective second terminal of the power source.

12. The asynchronous AC induction electrical machines of claim 1, wherein each of said first and second electrical machines is a three-phase, four-wire Y-connected asynchronous AC induction electrical machine and said power source is a three-phase, four-wire Y-connected power source.

13. The asynchronous AC induction electrical machines of claim 12, wherein first terminals of the phase windings of the first and second electrical machine main windings are respectively connected to R, S, and T terminals of the three-phase four-wire Y connected power source, and second terminals of the phase windings of the first and second electrical machine control windings are commonly connected in Y connection to the neutral terminal of the three-phase four-wire Y connected power source.

14. The asynchronous AC induction electrical machines of claim 1, wherein (a) first terminals of the phase windings of the first electrical machine main winding and second terminals of the phase windings of the first electrical machine control winding are in delta connection and further connected to the power source, and first terminals of the phase windings of the second electrical machine main winding and second terminals of the phase windings of the first electrical machine control winding are in delta connection and further connected to the power source, or (b) first terminals of the phase windings of the first electrical machine main winding and second terminals of the phase windings of the first electrical machine control winding are in delta connection and further connected to the power source, and first terminals of the phase windings of the second electrical machine main winding and second terminals of the phase windings of the second electrical machine control winding are in delta connection and further connected to the power source.

15. The asynchronous AC induction electrical machines of claim 1, wherein at least one of the first and second electrical machines includes an interactive body asynchronously actuated by an induced electrical magnetic effect from a rotating magnetic field.

16. The asynchronous AC induction electrical machines of claim 1, wherein at least one of the first and second electrical machines is one of an asynchronous AC induction squirrel cage motor, an asynchronous eddy current induction motor, an asynchronous induction squirrel cage generator, and an asynchronous eddy current induction generator, an asynchronous induction squirrel cage or eddy current motor/generator, and an asynchronous induction squirrel cage or eddy current electromagnetic coupling transmission device, and wherein the power source is voltage, frequency, or voltage and frequency modulated for controlling rotational speed, torque, direction, power regenerating braking, or transmission operations.

17. The asynchronous AC induction electrical machines of claim 1, wherein said main windings and control windings of the first and second electrical machines have one of the following excitation relationships:
- (a) the main and control windings all have a same polarity;
- (b) the main and control windings in each of the electrical machines have respective opposite polarities; and
- (c) within at least one of the first and second electrical machines, at least one phase winding of the main winding has a same polarity as a phase winding of the control winding, and at least one other phase winding of the main winding has an opposite polarity to another phase winding of the control winding.

18. The asynchronous AC induction electrical machines of claim 1, wherein the main and control windings of at least one of the first and second electrical machines has an electrical phase angle difference achieved through changes in a distribution shape of interacting magnetic fields of the main winding relative to the control winding.

19. Asynchronous AC induction electrical machines in cross-interlocked parallel connection, comprising:
- a first electrical machine, a second electrical machine, and at least one additional electrical machine, each said electrical machine having a control winding and a main winding, said control windings and main windings being coaxial or at a predetermined electrical angle difference, and said control windings and main windings having a same polarity for additive excitation or opposite polarities for differential excitation, first, second, and third electrical machines being parallel connected with a power source, as follows:
  - first terminals of the first, second, and additional electrical machine main windings are connected with at least one first terminal of the power source for input or output of electrical power,
  - a second terminal of the first electrical machine control winding is connected to a first terminal of the second electrical machine control winding,
  - a second terminal of the at least one additional electrical machine is connected to a first terminal of the first electrical machine control winding, and second terminals of the first, second electrical machine control windings are connected to each other or connected to each other and to at least one second terminal of the power source,
wherein changes in a load on one of the electrical machines causes changes in impedance in a winding of the other electrical machines to change a voltage ratio between the electrical machines and enable individual driving characteristics of the respective electrical machines to change accordingly.

* * * * *